United States Patent [19]

Ribas et al.

[11] 3,932,591

[45] Jan. 13, 1976

[54] PROCESS FOR THE MANUFACTURE OF PHOSPHORIC ACID WITH MINIMIZED ENVIRONMENTAL EFFECTS

[75] Inventors: Rogelio Serge Ribas, Decatur; John D. Nickerson, Atlanta, both of Ga.

[73] Assignee: United States Steel Corporation, Pittsburgh, Pa.

[22] Filed: Apr. 19, 1972

[21] Appl. No.: 245,336

[52] U.S. Cl. .............................. 423/319; 423/320
[51] Int. Cl.$^2$ ..................................... C01B 25/16
[58] Field of Search ..................... 423/304–321; 23/165

[56] References Cited
UNITED STATES PATENTS

| | | | |
|---|---|---|---|
| 2,586,545 | 2/1952 | LeBaron et al. | 423/305 X |
| 3,207,580 | 9/1965 | Cosway et al. | 423/320 |
| 3,375,067 | 3/1968 | Haseman | 423/319 |

*Primary Examiner*—Oscar R. Vertiz
*Assistant Examiner*—Gregory A. Heller
*Attorney, Agent, or Firm*—Arthur J. Grief

[57] ABSTRACT

An improved process for preparing wet process phosphoric acid by calcining a phosphate source at a temperature in the range of 1600° – 2200°F. The phosphate source may be wet or dry mined phosphate matrix, phosphate slimes, phosphate pebble or other phosphate source.

5 Claims, 3 Drawing Figures

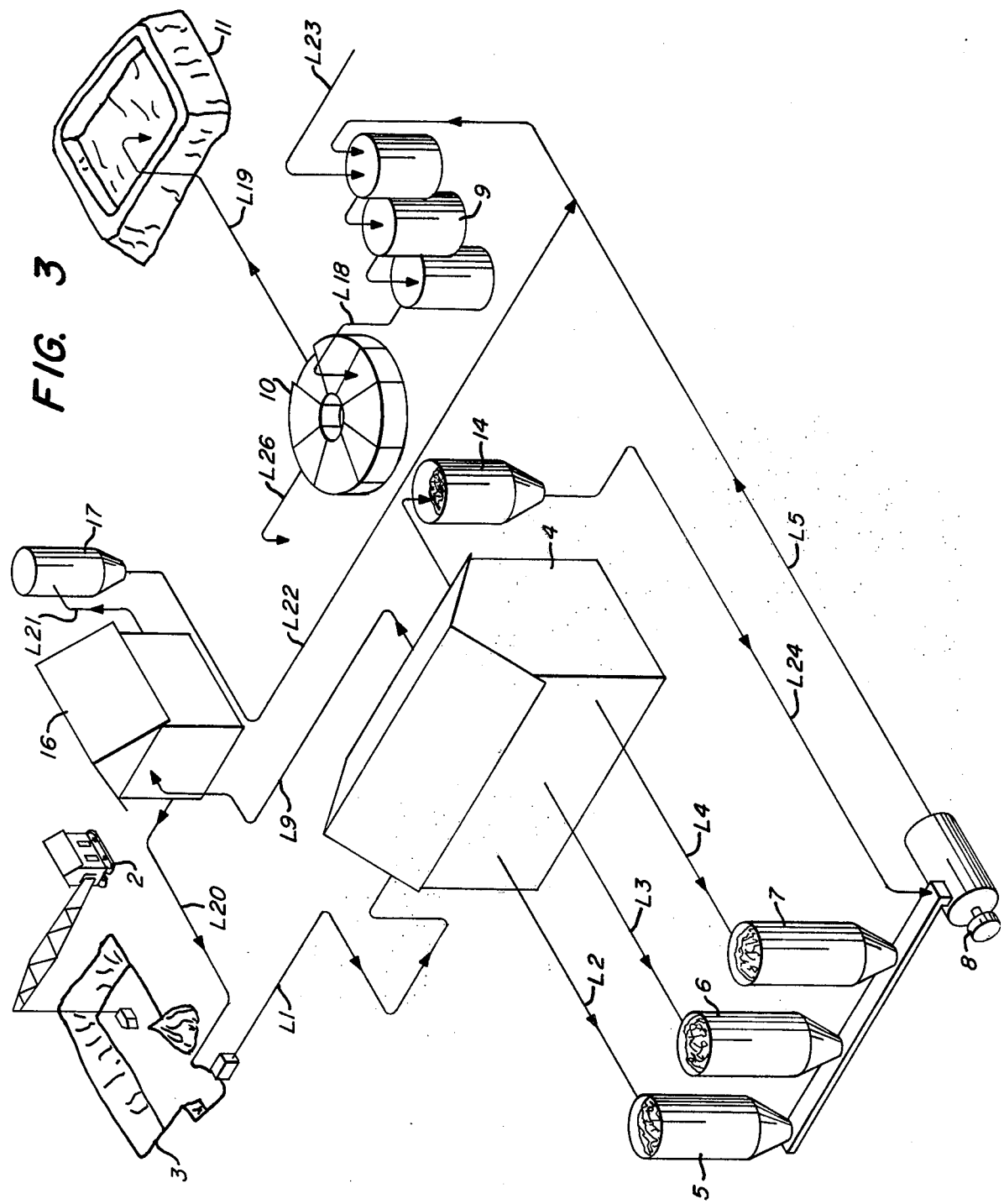

PROCESS FOR THE MANUFACTURE OF PHOSPHORIC ACID WITH MINIMIZED ENVIRONMENTAL EFFECTS

BACKGROUND OF THE INVENTION

Presently, phosphate rock is mined by stripping the overburden from the underlying phosphate bearing matrix, slurrying the matrix, consisting of a mixture of clay, sand and phosphate pebble, with water and pumping the slurry from the mine site to a beneficiation plant where the matrix is washed, scrubbed and beneficiated to produce an upgraded pebble, phosphate rock concentrates, a slimes slurry and sand tailings. The slimes slurry consists mainly of clays, sand and very fine particles of phosphate rock. Generally, about 0.75 to 1 part by weight of slimes slurry is produced per part by weight of upgraded pebble and rock concentrate. In present practice, the simes, a dilute aqueous suspension of about 2 to 5 weight percent solids containing about 30 to 40 weight percent of the phosphate matrix, are disposed of by pumping into settling ponds built over previously mined areas. Over a period of time, the entrained solids slowly settle.

As presently practiced, slimes disposal procedures have many clearly defined and long recognized deficiencies. Among them is the need for large land areas set aside for slimes ponds. For example, a plant producing 2 million tons of phosphate rock per year will, over a period of 15 years, require approximately 4,500 acres of land for slimes ponds. And because of the slow settling rate of the entrained solids, such land is unusable for decades. Further, since the volume of the hydrated slimes and overburden is approximately 1.5 times greater than the volume of the mine pits, unsightly retaining dams often 35 feet high are necessary around the perimeter of each disposal area. The possibility of dam breakage always exists with resulting river, lake and stream pollution. Also of great importance is the use and retention of large quantities of water.

Another important deficiency in the percent procedures is the poor recovery of phosphate values from the matrix since the 30 to 40% of the phosphate values retained in the slimes are never recovered.

The recognition of these deficiencies has led experimenters to propose various alternatives over the years. Flotation techniques for ultra-fine particles to separate clays and phosphate values have been unsuccessful in terms of both cost and recovery.

Acid leaching of slimes has not been practical due to extreme difficulty in filtering the clays and other gangue materials from the slurries and the relatively low concentration of phosphate in the filtrate. Further, since the clays and other gangue in both matrix and slimes contain relatively high levels of acid-soluble iron, aluminum and magnesium compounds compared to beneficiated rock, acid leaching of such materials results in phosphoric acid of inferior quality.

Other methods of slimes disposal have been proposed, including using the slimes as aggregates for highway construction or as bricks for home construction or thickening the slimes to provide for improved water conservation and more rapid land reclamation. These methods have not proved practical.

One other method has been proposed to remove the slimes disposal problem; the use of dry unbeneficiated matrix. Previous attempts in this area have failed because of process difficulties and the poor quality of the phosphoric acid produced. These problems arise from the fact that the presence of a significant amount of clay results in poor filtration and from the further fact that the high iron and aluminum content of the clays affects calcium sulfate crystal size and form and product purity.

Thus, there presently exists a need for a slimes disposal process which will accomplish practicably the following design objectives: (1) recovery of presently discarded phosphate values; (2) elimination of the pond system for slimes disposal; (3) conservation of process water; and (4) provision of potentially closed loop operation of the phosphate mining and phosphoric acid production facility.

SUMMARY OF THE INVENTION

We have discovered a process which meets the foregoing design objectives. Simply stated, our process consists of pre-conditioning a phosphate source, prior to digestion, by calcination at a temperature in the range of 1600°– 2200°F, preferably 1750° – 2000°F. This pre-conditioning allows the use of dry, as-mined matrix in the digestion process and obviates the necessity of a beneficiation step. This in turn means that no slimes are produced, no slurry water is necessary, mined land can be reclaimed immediately, and presently discarded phosphate values are recovered. Not only will our process provide for immediate land reclamation and water conservation in the future, but it can also be used to recover the phosphate values from previously discarded slimes, thus clearing previously used land for productive use.

We have discovered that as yet unidentified reactions take place in the temperature range of 1600° – 2200°F which result in a phosphate source which, when digested with a mineral acid, yields an easily filterable slurry and in which a sizeable portion of the iron, aluminum and magnesium impurities in the phosphate source are rendered insoluble.

DETAILED DESCRIPTION

The phosphate source is preferably phosphate rock matrix, beneficiated phosphate rock or phosphate slims. Phosphate rock matrix is the dry or damp mixture of phosphate pebble, clay and sand as recovered from a phosphate mine. Before being fed to our process, it is ground and sized. Beneficiated phosphate rock is phosphate rock matrix that has been slurried with water and beneficiated by a complex but conventional procedure involving wet screening, hydroseparation and flotation. Three size fractions are usually produced: (1) a plus 16-mesh pebble rock; (2) a $-16 + 48$ mesh intermediate fraction and (3) a $-48 + 150$ mesh flotation concentrate. That portion of the product from the beneficiation plant that is $-150$ mesh is designated slimes and is usually disposed of in slimes ponds. These slimes contain an estimated ⅓ of the phosphate in the matrix.

In the preferred dry embodiment of our process, the as-mined phosphate rock matrix is not slurried, as in the conventional wet process, but rather is conveyed dry to a sizing station where it is sized before being fed to the calciner. If the sizing operation requires fine grinding, the matrix is first dried. The size of the matrix entering the calciner may vary within wide limits, larger particles of course needing more time in the calciner, but generally we have found that best results are obtained when about 70 to 80% of the matrix passes through a 200 mesh screen. If the matrix has this size range, no further grinding is necessary after calcining. The calcined matrix is transported, preferably by a fluidized transport system, to the digestion step.

An alternative embodiment of our invention employs beneficiated phosphate rock and calcined slimes. Just as in prior processes the mined matrix is slurried with water, beneficiated, and sized. The slimes from the beneficiation step are dewatered to a solids content of at least about 40%, preferably about 50% and calcined at a temperature in the range of 1600°–2200°F, preferably 1750°–2000°F. The calcined slimes are combined with the size beneficiated pebble streams prior to being fed to the digestion step. Even better results may be obtained by combining the dewatered slimes with the beneficiated pebble and calcining the mixture.

In a third embodiment of our invention, dewatered slimes from previously existing slimes ponds are the sole phosphate source, or are combined with beneficiated phosphate rock.

Regardless of the type of phosphate source used, after suitable conventional preparation, some or all of the material is fed to a calciner where it is heated to a temperature in the rannge of 1600°–2200°F, preferably 1750°–2000°F. Conventional calcination procedures are employed.

After calcination, the rock, if not previously ground, is ground to about 70% passing a 200 mesh screen before digestion with a mineral acid. The mineral acid may be phosphoric, sulfuric, nitric, or hydrochloric.

Figure 1:
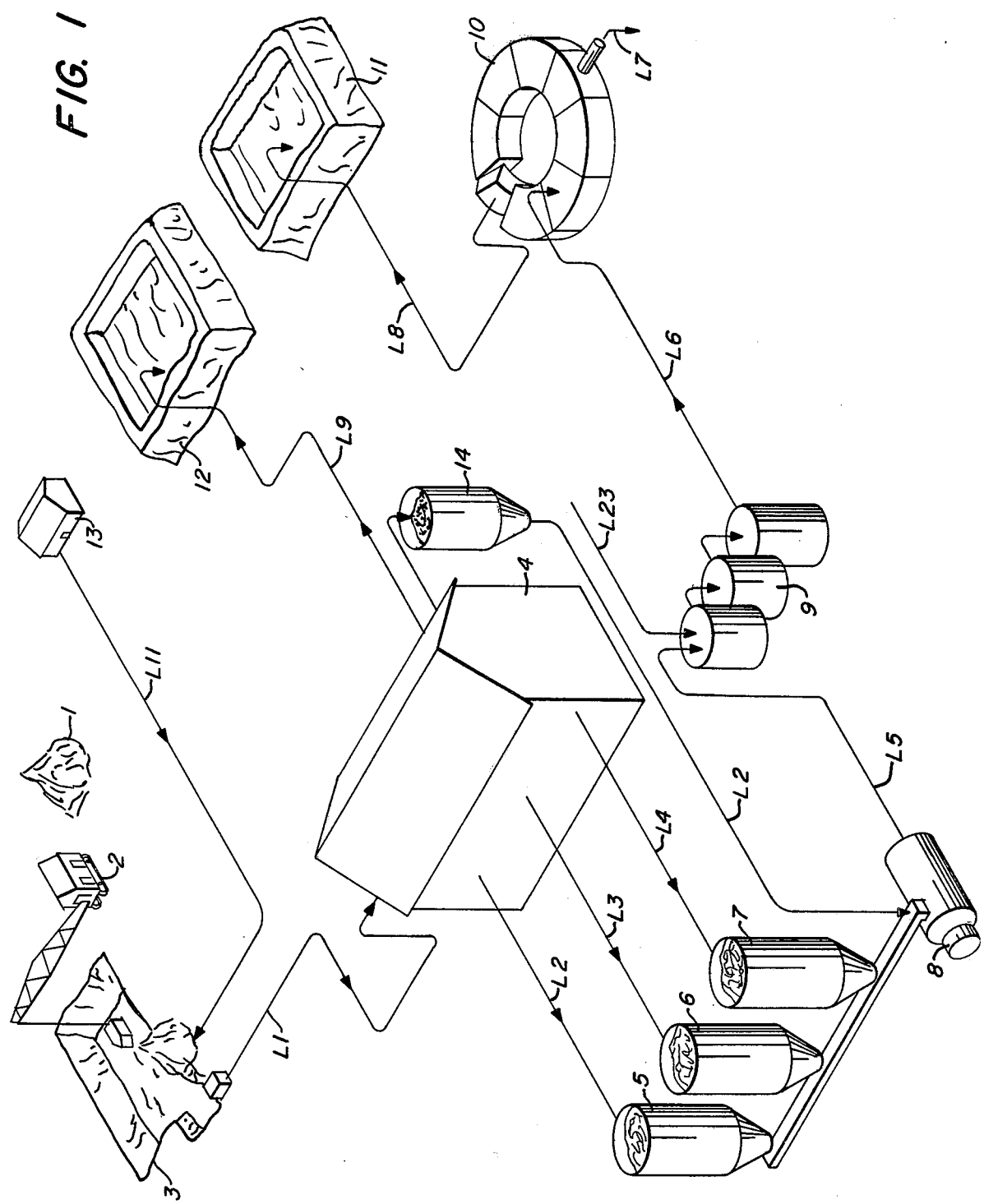
Figure 2:
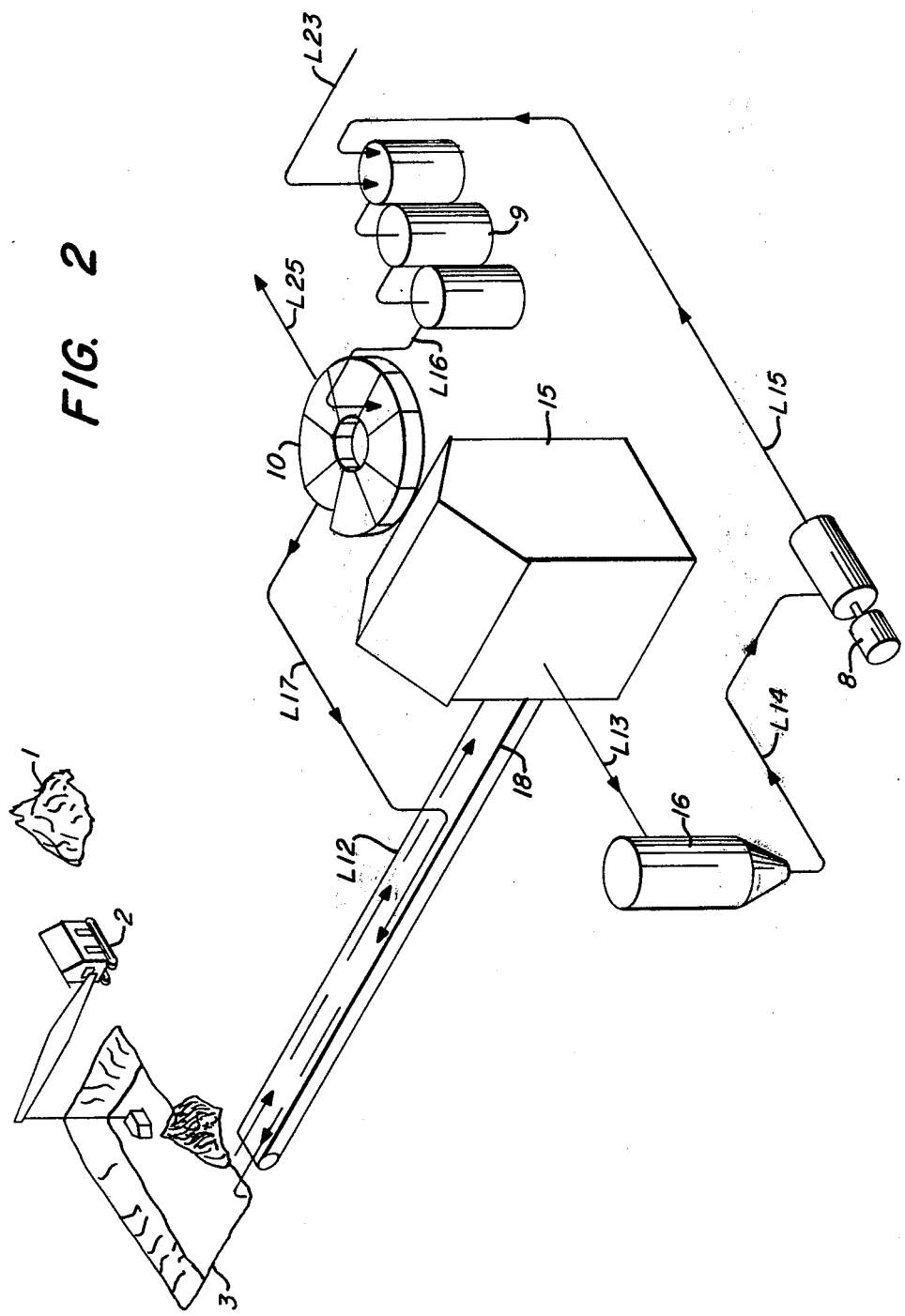

Our invention is further explained but not limited by reference to FIGS. 1, 2 and 3.

FIG. 1 shows the conventional process for the mining preparation and digestion of phosphate rock pebble. The overburden 1 from a phosphate mine 3 is removed by dragline 2 to expose the phosphate containing layer. A stream of water L-11 is pumped into the mine to form a slurry with the phosphate matrix. The slurry of phosphate matrix and water is pumped along line L-1 to the beneficiation plant 4. Lines L-2, L-3 and L-4 are the coarse, medium and fine pebble fractions from the beneficiation plant 4 which are fed to storage bins 5, 6 and 7. A slimes slurry L-9 is pumped to slimes pond 12. A phosphate concentrate is conveyed into phosphate concentrate storage 14. The pebble from the storage bins 5, 6 and 7 is fed to grinder 8. It is then conveyed to the phosphoric acid digestion plant 9 where it is digested with sulfuric acid L-23. The slurry from the phosphoric acid digestion is pumped through L-6 to filter 10. The phosphoric acid product exits the filter 10 through L-7. The calcium sulfate cake from the filter is pumped through line L-8 to the filter cake discard pond 11.

FIG. 2 depicts the matrix embodiment of our invention. Dragline 2 removes the overburden 1 from phosphate mine 3 thereby exposing the phosphate matrix. The dry phosphate matrix is conveyed along conveyor 18 to the matrix sizing plant 15. The sized matrix flows through L-13 to the calciner 16. Exiting from the bottom of the calciner 16 the matrix is carried by conveyor L-14 to grinder 8, then by L-15 to the phosphate acid digestion plant 9 where it is digested with sulfuric acid L-23. The resulting slurry is pumped through L-16 to filter 10 and product phosphoric acid is removed through L-25. The filter cake is conveyed by L-17 onto conveyor 18 and then back to the phosphate mine 3.

FIG. 3 depicts another embodiment of our invention. Water from the slimes dewatering plant 16 is pumped through line L-20 to phosphate mine 3 where dragline 2 has previously removed the overburden 1 thus exposing the phosphate matrix. The phosphate matrix, slurried with water, is pumped along line L-1 to the washer and flotation plant 4. A slimes slurry leaves the washer and flotation plant 4 through line L-9 and after dewatering at 16 is conveyed through L-21 to calciner 17. The calcined slimes are then conveyed by line L-22 to the phosphoric acid digestion step. A phosphate concentrate is also recovered from the washer and flotation plant 4. It is conveyed to phosphate concentrate storage 14 and is then conveyed through line L-24 to the grinder 8. Sized pebble is also recovered from washer and flotation plant 4. Lines L-2, L-3 and L-4 contain coarse, medium and fine pebble respectively and lead to storage bins 5, 6 and 7. The pebble flows to the grinder 8 and then through line L-5 to the phosphoric acid digestion step 9. The resultant phosphoric acid calcium sulfate slurry is pumped through L-18 to the filter 10 and the product phosphoric acid withdrawn through line L-26. The calcium sulfate cake is pumped through line L-19 to filter cake disposal pond 11.

Our invention is further illustrated by the following non-limiting examples.

EXAMPLE 1

Four 100-gram portions of air dried phosphate slimes recovered from a dilute slimes slurry were calcined for 1 hour at the followng temperatures:

| Sample | Calcination Temperature |
|--------|-------------------------|
| A | not calcined |
| B | 1200 |
| C | 1600 |
| D | 1800 |

The quantity of phosphoric acid necessary to convert all the phosphate in the slimes to monocalcium orthophosphate according to the following equation was calculated and a threefold excess was added (224 g. of 62.5% c.p. $H_3PO_4$).

$$[Ca_3(PO_4)_2]_3CaF_2 + 14H_3PO_4 \rightarrow 10Ca(H_2PO_4)_2 + 2HF$$

Each sample was digested in the $H_3PO_4$ for ½ hour at 140°F. Sufficient water was then added to provide an 18–20% solids slurry. The residue from the digestions was removed by filtration and the filtration rates of each determined with the following results.

| Sample | Table I Analysis, % | | | | $P_2O_5$ Solubilized,% | Filtration Rate, gal./hr. ft.² |
|--------|------|------|------|------|------|------|
| | $P_2O_5$ | $Fe_2O_3$ | $Al_2O_3$ | MgO | | |
| Feed Slimes (dried) | 16.04 | 4.78 | 13.65 | 2.27 | — | — |
| Feed Slimes (calcined) | 16.76 | 5.54 | 15.01 | 2.61 | — | — |
| Feed Slimes (at 30% $P_2O_5$)[1] | 30.0 | 10.4 | 27.8 | 4.8 | — | — |
| Filtrate A (uncalcined) | 30.0 | 10.9 | 12.8 | — | 79.6 | 0.31 |
| Filtrate B (1200°F) | 30.0 | 4.2 | 12.7 | — | 97.6 | 27.4 |

-continued

| Sample | Table 1 Analysis, % | | | | $P_2O_5$ Solubilized, % | Filtration Rate, gal./hr. ft.$^2$ |
|---|---|---|---|---|---|---|
| | $P_2O_5$ | $Fe_2O_3$ | $Al_2O_3$ | MgO | | |
| Filtrate C (1600°F) | 30.0 | 1.4 | 8.8 | — | 92.1 | 29.6 |
| Filtrate D (1800°F) | 30.0 | 1.0 | 3.8 | 2.9 | 93.9 | 168 |

$^1$All results expressed on the same $P_2O_5$ basis for comparison purposes.

The above results show the increasing rejection of iron and aluminum with increasing calcining temperatures. In the case of 1800°F calcination, 87% of the $Al_2O_3$ and 90.8% of the $Fe_2O_3$ have been rejected with 93.9% recovery of the phosphate values. The remarkable increase in filtration rate for 1800°F calcination is a most unexpected result. MgO rejection is 44%.

EXAMPLE 2

A 100-gram portion of sample D of Example 1, after calcination, was digested for ½ hour at 140°F in a mixture of 300% excess of c.p. $H_3PO_4$ as in Example 1 and 1% excess of $H_2SO_4$ over that required to precipitate all the calcium in the slimes as gypsum. The following analysis of the filtrate was obtained.

Table II

| | Analysis,% | | | $P_2O_5$ | Filtration Rate, |
|---|---|---|---|---|---|
| $P_2O_5$ | $Fe_2O_3$ | $Al_2O_3$ | MgO | Solubilized, % | gal./hr./ft.$^2$ |
| 30.0 | 0.77 | 4.4 | 2.7 | 100 | 300 |

EXAMPLE 3

Two 100-gram portions of as-mined phosphate matrix were dried, crushed, and uniformly mixed. One portion was calcined at 1800°F for 1 hour. Each portion was digested with 300% excess c.p. phosphoric acid with sufficient sulfuric acid present to maintain 2.5% excess over that required to precipitate all the calcium contained in the BPL value in the matrix as calcium sulfate (gypsum). Both digestions were made at 160°F for 30 minutes with a 20% solids slurry. The slurries were filtered, filtration rates determined, and analysis obtained on the filtrates as follows:

Table III

| Sample | Analysis, % | | | | $P_2O_5$ Solubilized,% | Filtration Rate, gal./hr./ft.$^2$ |
|---|---|---|---|---|---|---|
| | $P_2O_5$ | $Fe_2O_3$ | $Al_2O_3$ | MgO | | |
| Matrix (dried) | 19.29 | 2.09 | 2.60 | 0.41 | — | — |
| Matrix (1800°F) | 19.92 | 2.31 | 2.83 | 0.45 | — | — |
| Matrix (at 30% $P_2O_5$) | 30.0 | 3.25 | 4.04 | 0.64 | — | — |
| Filtrate A (uncalcined) | 30.0 | 3.32 | 3.92 | 0.55 | 87.6 | 80.8 |
| Filtrate B (1800°F) | 30.0 | 1.91 | 1.74 | 0.26 | 95.3 | 390 |

The above results show the effect of 1800°F calcining on "as is" mined matrix when the calcined matrix is digested with sulfuric acid to produce wet-process phosphoric acid.

For comparison purposes, two "typical" wet-process phosphoric acid analyses are given below.

Table IV

| | Analysis,% | |
|---|---|---|
| | Acid A | Acid B |
| $P_2O_5$ | 30.0 | 30.0 |
| $Fe_2O_3$ | 0.78 | 1.22 |
| $Al_2O_3$ | 1.56 | 1.10 |
| MgO | 0.22 | 0.34 |

EXAMPLE 4

This example illustrates that by practicing the calcining step of our invention on beneficiated phosphate rock, a more easily filtered digestion slurry is produced and a higher quality phosphoric product can be recovered.

Two 100-gram portions of ground phosphate pebble were dried, and one portion calcined at 1800°F for 1 hour. Each portion was digested with a mixture of phosphoric acid at 270% excess and sulfuric acid such that an excess of 2.5% $H_2SO_4$ was maintained over that required to precipitate all the calcium contained in the BPL value of the pebble as calcium sulfate (gypsum). Gypsum slurry filtration rate and filtrate analysis were determined with the following results:

Table V

| Sample | Analysis,% | | | | $P_2O_5$ Solubilized,% | Filtration Rate, gal./hr./ft.$^2$ |
|---|---|---|---|---|---|---|
| | $P_2O_5$ | $Fe_2O_3$ | $Al_2O_3$ | MgO | | |
| Pebble (dried) | 29.51 | 1.95 | 1.20 | 0.35 | — | — |
| Pebble (at 30% $P_2O_5$) | 30.0 | 1.98 | 1.22 | 0.36 | — | — |
| Filtrate A (uncalcined) | 30.0 | 2.05 | 1.17 | 0.29 | 97 | 111 |
| Filtrate B (1800°F) | 30.0 | 1.34 | 0.76 | 0.27 | 95 | 207 |

Again, calcining to 1800°F reduces the iron, aluminum, and magnesium leached, and improved by a factor of two the filtration rate, without a significant reduction in phosphate recovery.

We claim:

1. In a process for producing phosphoric acid wherein phosphate rock is mined, beneficiated, the beneficiated product separated into a slimes stream, one or more pebble streams, and a concentrate stream, the slimes stream discarded, and the pebble streams digested with mineral acid and filtered to remove impurities, the improvement comprising dewatering the slimes stream to a solids content of at least 40 percent by weight, calcining the dewatered slimes at a temperature in the range of 1600° to 2200°F, combining the calcined slimes with the beneficiated pebble prior to digesting with a mineral acid and filtering the resultant slurry to remove solid matter.

2. The process of claim 1 wherein the dewatered slimes have a solids content of about 50 percent by weight and the calcination temperature is in the range of 1750° to 2000°F.

3. The process of claim 1 wherein the dewatered slimes are added to the beneficiated pebble prior to calcination and the mixture calcined at a temperature in the range of 1600° to 2200°F.

4. The process of claim 3 wherein the calcination temperature is in the range of 1750° to 2000°F.

5. A process for the preparation of phosphoric acid from phosphate slimes comprising dewatering the slimes to a minimum solids content of 40 percent by weight, calcining the dewatered slimes at a temperature in the range of 1600° to 2200°F digesting the calcined slimes in a mineral acid, and filtering to remove solid matter from the product phosphoric acid.

* * * * *